United States Patent
Debelak et al.

(10) Patent No.: US 8,381,704 B2
(45) Date of Patent: Feb. 26, 2013

(54) METHOD FOR ASSIGNING ADDRESSES TO INJECTORS

(75) Inventors: Albrecht Debelak, Friedrichshafen (DE); Andreas Schneider, Meckenbeuren (DE); Aron Toth, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 238 days.

(21) Appl. No.: 12/934,482

(22) PCT Filed: Mar. 17, 2009

(86) PCT No.: PCT/EP2009/001936
§ 371 (c)(1), (2), (4) Date: Sep. 24, 2010

(87) PCT Pub. No.: WO2009/118121
PCT Pub. Date: Oct. 1, 2009

(65) Prior Publication Data
US 2011/0066781 A1 Mar. 17, 2011

(30) Foreign Application Priority Data
Mar. 25, 2008 (DE) .......................... 10 2008 015 536

(51) Int. Cl.
*F02M 51/00* (2006.01)
(52) U.S. Cl. ........................................ 123/478; 123/480
(58) Field of Classification Search ................... 701/104, 701/113, 115; 123/179.16, 478, 480, 491
See application file for complete search history.

(56) References Cited

U.S. PATENT DOCUMENTS 3,835,819 A * 9/1974 Anderson, Jr. ........... 123/406.47
4,140,088 A * 2/1979 de Vulpillieres .............. 123/478

FOREIGN PATENT DOCUMENTS

| DE | 4420425 A1 | 12/1995 |
| DE | 10117809 | 10/2002 |
| DE | 10153848 A1 | 5/2003 |
| EP | 1653363 | 5/2006 |

OTHER PUBLICATIONS

Thomas Dohmke: Bussysteme im Automobil CAN, Flexray und MOST, Internet Article, Mar. 2002, pp. 1-22, XP002535827.

\* cited by examiner

*Primary Examiner* — John Kwon
(74) *Attorney, Agent, or Firm* — Lucas & Mercanti, LLP; Klaus P. Stoffel

(57) ABSTRACT

A method for assigning addresses to injectors of an internal combustion machine, wherein, prior to the starting procedure, an electronic motor control device selects a first injector by activating the first injector by a first control line from the electronic motor control device. The electronic motor control device is arranged on a data bus to which the electronic motor control device and all injectors are connected. A first address value is placed on the motor control device and the first injector assumes the first address value as the address assigned to it.

10 Claims, 2 Drawing Sheets

METHOD FOR ASSIGNING ADDRESSES TO INJECTORS

BACKGROUND OF THE INVENTION

The invention relates to a method for assigning addresses to injectors, wherein, prior to the starting procedure, an electronic motor control device assigns an individual address to each injector, and to a correspondingly constructed device for carrying out the method.

In the method known from DE 101 17 809 A1, a selected injector is activated prior to the starting procedure of the internal combustion machine by supplying current for a short time to the injector. For this purpose, the electronic motor control device closes a first switch (highside-switch), which causes the positive potential of the supply voltage to be connected through a line to the voltage supply at the injector. Simultaneously, the electronic motor control device closes a second switch (lowside switch), which causes the negative potential of the supply voltage, for example, mass, to be connected through a control line to the injector. Arranged on the injector is an electronic component which includes a comparator, a logic unit and a data circuit. Because of the voltage pulses, the injector transmits its permanently stored address to the electronic motor control device as a result of the electronic component influencing the potential on the line for voltage supply. After the electronic motor control device has called on the addresses of all injectors, the motor control device knows the assignment of cylinders and the address of the injector. Subsequently, the electronic motor control device reads the individual data of the individual injectors and changes into the actual modus operandi, i.e., the injection operation. In this single-wire communication, the line to the voltage supply of the injector simultaneously forms a data bus.

The conversion of this procedure to a large diesel engine with, for example, sixteen cylinders, is critical, because when the software is adjusted for the electronic motor control device, the addresses of the injectors are not known and, therefore, constitutes a corresponding source of errors.

SUMMARY OF THE INVENTION

The invention is based on the object of developing a secure method and a device which are also suitable for high numbers of cylinders.

The inventive method resides in that the electronic motor device assigns through a serial or parallel data bus an address to a selected injector. For this purpose, prior to the starting procedure, the electronic motor control device selects a first injector by the first injector being activated through a first control line by the electronic motor control device. Subsequently, the electronic motor control device places a first address value on the data bus to which the electronic motor control device and all injectors are connected. Since only the first injector is activated, the first injector recognizes the first address value as the address assigned to it. The first address value is then taken by the first injector as the address assigned to it and stores the latter in a permanent storage, for example, an EEPROM. Typically, an address value consists of a value characterizing the cylinder bank and a running number for the injectors of this cylinder bank. The receipt of the first address is acknowledged by the first injector by placing an acknowledgement value on the data bus (positive acknowledgement). After receiving the acknowledgement, the electronic motor control device deactivates the first injector through a first control line. The previously described method is then continued until all injectors are assigned an individual address by the electronic motor control device. When the method is concluded, the injection system is ready to start.

The device for carrying out the method includes, next to the electronic motor control device as the master and the injectors as slaves, a common serial or parallel data bus, for example, a CAN bus, and a control line respectively between an injector and the electronic motor control device. Through the control line, an injector is activated or deactivated by the electronic motor control device, wherein for activating the injector the injector is connected through the control line with the reference potential of the supply voltage, for example, mass. Arranged at the injector is an electronic component which includes at least a processor as computation unit, a data storage and optionally an energy storage. Through the energy storage, the electronic component is supplied temporarily with energy, for example, in the injection intervals. Filling the energy storage takes place, for example, during injection of the injector. The energy storage can be constructed as an accumulator or a capacitor.

In the method according to the invention and in the device according to the invention it is advantageous that the injectors can be exchanged within the cylinder bank, between the cylinder banks or also between different motors. Since the electronic motor control device assigns the addresses to the injectors, the software preparation is simple and the process safety is increased with the error possibility being reduced. By using an injector with a computation unit in addition to energy storage, a bidirectional communication can be realized even in the injection intervals. In addition, the device is capable of diagnosis because the selected injector acknowledges the receipt of the address value.

DETAILED DESCRIPTION OF THE INVENTION

Figure 1:
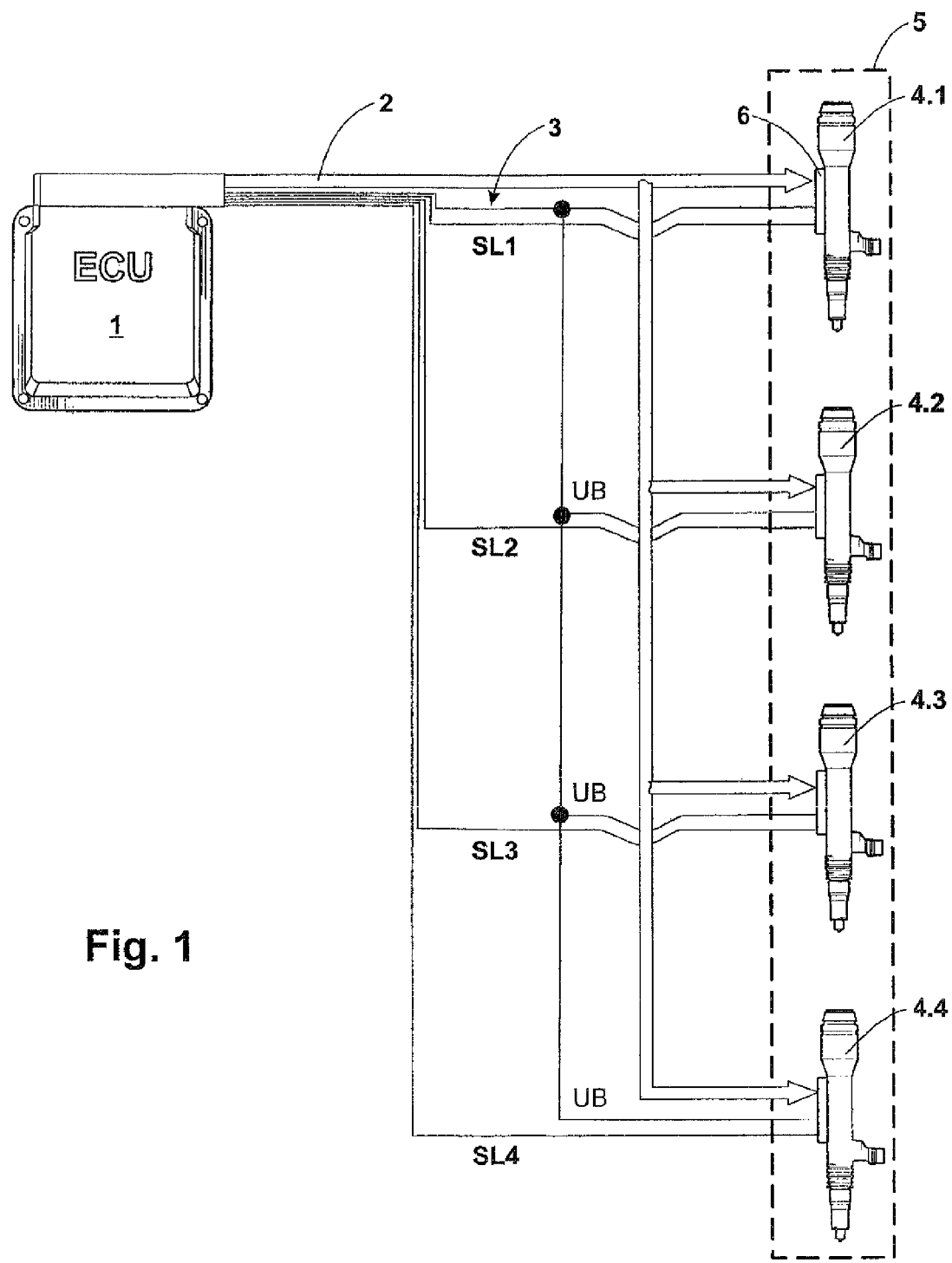
FIG. 1 shows the device as a block diagram.

FIG. 1 shows the device as a block diagram with an electronic motor control device 1 (ECU) and a cylinder bank 5 with four injectors 4.1 through 4.4. Through a data bus 2, for example, a CAN bus, the electronic motor control device 1 and the injectors 4.1 through 4.4 can communicate with each other. Integrated in the electronic control device 1 are switches (lowside switches) through which the negative potential of the supply voltage, i.e., for example, the mass potential, is connected via a control line to an injector, for example, through the first control line SL1 at the first injector 4.1 or through a second control line SL2 to the second injector 4.2. The voltage supply can take plate, as illustrated, through a line 3 or through the data bus. If a line 3 is used for the voltage supply, a switch (highside switch) is integrated in the electronic motor control device 1, wherein the switch serves to connect the positive potential of the supply voltage UB, for example, 42V, via the line 3 to all injectors 4.1 through 4.4. Arranged on the injector is an electronic component 6 which comprises a processor, a data storage (EEPROM) and optionally an energy storage, for example, a capacitor or accumulator. In practical motor operation, an injector is activated through the corresponding control line; in other words, the injector injects fuel into the combustion chambers of the internal combustion engine. During the injection interval, the processor is supplied with electrical energy from the electric energy storage, so that bidirectional communication takes place between the electronic motor control device 1 and the injectors also during the injection intervals. An injector with a corresponding electronic component including an energy storage is known from DE 10 2006 029 082 A1.

Figure 2:
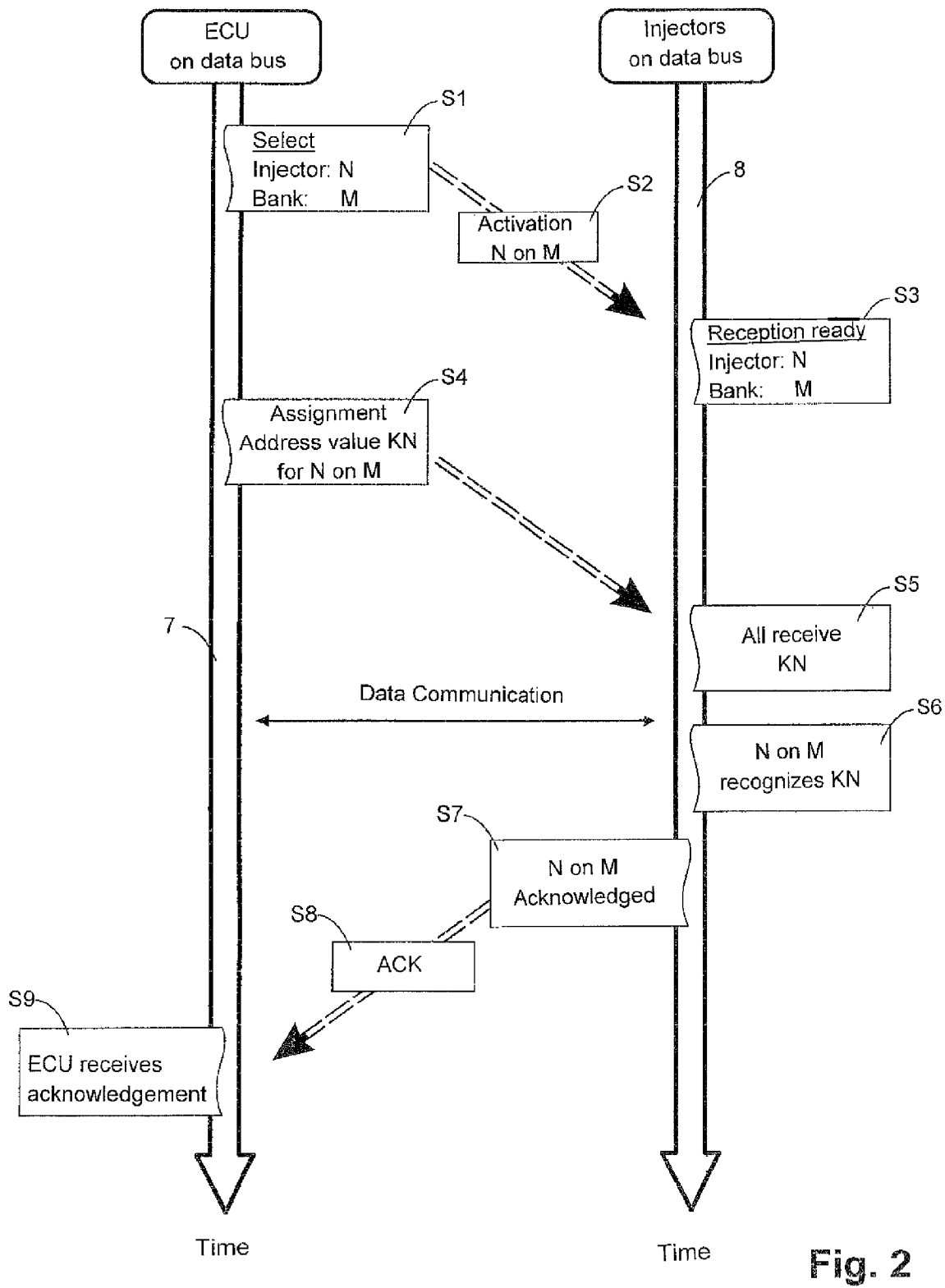
FIG. 2 shows the method by means of the information on the data bus.

The further description takes place together with that of FIG. 2, in which the method for the assignment of addresses to injectors over time is illustrated. For a better understanding, the data bus 2 is shown as a flow diagram in time sequence of the data communication between the electronic motor control device (ECU) and the injectors. On an action path 7, the actions are illustrated which refer to the electronic motor control device (ECU). On an action path 8, actions are illustrated which relate to the injectors.

After the operator has activated the electronic motor control device 1, the latter selects at S1 an injector N on a cylinder bank M. As a result of the cable connections, the electronic motor control device 1 recognizes the assignment of the injector to the cylinder bank, for example, the first injector 4.1 to the cylinder bank 5. At S2, the injector is briefly activated by connecting through the appropriate control line the injector with the negative potential of the supply voltage, for example, mass. For the example described above, this is the first injector 4.1 through the first control line SL1. The activation of the injector takes place briefly below the response threshold of the actuator. The activated injector changes to the reception modus and waits for an address value S3. At S4, the electronic motor control device 1 sets the address value KN for the injector N at the cylinder bank M. For example, the address value 1011 for the first injector 4.1 at the cylinder bank 5. The address value is composed of a value characterizing the cylinder bank and a running number for the injectors of this cylinder bank. All injectors are connected to the data bus; therefore, all injectors receive this address value KN, S5. However, since only the injector N at the cylinder bank M is activated, it is only this injector that recognizes the address value S6 and assumes this address value as the address assigned to it. At S7, the selected injector acknowledges the receipt of the address value KN by placing at S8 an acknowledgement ACK on the data bus in form of a positive acknowledgement. The entire data communication can take place through conventional data security methods, for example, RC. After the electronic motor control device 1 has recognized the acknowledgement value ACK at S9, the address assignment is concluded for the injector N at the cylinder bank M. If the electronic motor control device does not receive a positive acknowledgement within a fixed period of time, the address assignment can be repeated for this injector. The safety against interference is improved as a result. Subsequently, the method is once again undergone by another injector, for example, the second injector 4.2. The method is concluded when the electronic motor control device 1 has assigned an address to all injectors. The injection system is then ready for starting.

The following advantages of the invention can be concluded from the specification:
- the injectors within the cylinder bank, between the cylinder banks but also between different motors are exchangeable because the electronic motor control device assigns the addresses to the injectors each time the device is switched on;
- dating of the electronic motor control device is simplified and the process becomes safer;
- by using an injector with a computation unit in addition to energy storage, a bidirectional communication can be realized, also in the injection intervals;
- the device is capable of diagnosis because the selected injector acknowledges the receipt of the address value;
- reading of the individual injector properties from a data storage at the injector is still possible.

Reference Numerals

1 electronic motor control device
2 data bus
3 line to the power supply
4.1 first injector
4.2 second injector
4.3 third injector
4.4 fourth injector
5 cylinder bank
6 electronic component
7 action path (electronic motor control device)
8 action path (injector)

The invention claimed is:

1. A method for assigning addresses to injectors of an internal combustion engine, comprising the steps of: prior to a starting procedure, selecting a first injector and activating the first injector through a first control line by an electronic motor control device so that in practical motor operation the first injector is activated via the first control line to inject fuel; and placing a first address value on a data bus to which the electronic motor control device and all injectors are connected, the electronic motor control placing the address value on the data bus, the first injector assuming the first address value as the address assigned to it.

2. The method according to claim 1, wherein the first injector acknowledges receipt of the first address value by placing an acknowledgement value on the data bus.

3. The method according to claim 2, wherein the electronic motor control device concludes the address assignment after receiving the acknowledgement.

4. The method according to claim 3, wherein the electronic motor control device selects a second injector through a second control line and the second injector is activated by the electronic motor control device via a second control line so that in practical motor operation the second injector is activated via the second control line to inject fuel, the electronic motor control device places a second address value on the data bus, and the second injector assumes the second address value as the address assigned to it.

5. The method according to claim 1, wherein the address value is composed of a value characterizing a cylinder bank and a running number for the injectors of the cylinder bank.

6. The method according to claim 1, wherein the method concludes after all injectors have been assigned an individual address by the electronic motor control device.

7. The method according to claim 6, wherein the electronic motor control device and the injection system are ready for start with conclusion of the method.

8. A device for assigning addresses to injectors of an internal combustion engine, comprising: a data bus; an electronic motor control device as a master; injectors as slaves, the motor control device and the injectors being jointly connected to the data bus; a separate control line connecting each injector to the motor control device over which each injector, during address assignment before a start operation as well during practical motor operation for injecting fuel, is activated or deactivated by the electronic control device; and an electronic component arranged at each injector, wherein the electronic component includes a processor as a computation unit and a data storage.

9. The device according to claim 8, and further comprising an energy storage arranged at each injector for storing electrical energy, wherein the energy storage temporarily supplies the electronic component with energy.

10. The device according to claim 9, and further comprising a voltage supply, the injectors being jointly connected to a line connected to the voltage supply.

* * * * *